United States Patent [19]

Balakrishnan

[11] Patent Number: 5,313,381
[45] Date of Patent: May 17, 1994

[54] THREE-TERMINAL SWITCHED MODE POWER SUPPLY INTEGRATED CIRCUIT

[75] Inventor: Balu Balakrishnan, Saratoga, Calif.

[73] Assignee: Power Integrations, Inc., Mountain View, Calif.

[21] Appl. No.: 938,704

[22] Filed: Sep. 1, 1992

[51] Int. Cl.⁵ .............................. H02M 1/00
[52] U.S. Cl. ..................... 363/147; 363/21; 363/97; 363/131
[58] Field of Search ............ 363/20, 21, 97, 131, 363/147

[56] References Cited

U.S. PATENT DOCUMENTS

| | | | |
|---|---|---|---|
| 4,228,493 | 10/1980 | de Sartre et al. | 363/97 |
| 4,622,627 | 11/1986 | Rodriguez et al. | 363/21 |
| 4,688,157 | 8/1987 | Rischmueller | 363/20 |
| 4,862,339 | 8/1989 | Inou et al. | 363/21 |
| 5,014,178 | 5/1991 | Balakrishnan | 563/97 |
| 5,161,098 | 11/1992 | Balakrishnan | 363/147 |
| 5,245,526 | 9/1993 | Balakirshnan et al. | 363/97 |
| 5,262,933 | 11/1993 | Shyi-Hon | 363/21 |

OTHER PUBLICATIONS

"En Direct Du Secteur"; Electronique No. 19; Jun. 1992; p. 86.

Primary Examiner—Jeffrey L. Sterrett
Attorney, Agent, or Firm—Thomas E. Schatzel

[57] ABSTRACT

An embodiment of the present invention is a three-terminal switched mode power supply chip with a signal terminal for accepting a combination of a feedback control signal and bias supply voltage to operate the chip. A feedback extraction circuit separates the feedback signal from the power supply voltage within the chip by sensing the excess current flowing through a shunt regulator.

11 Claims, 3 Drawing Sheets

5,313,381

THREE-TERMINAL SWITCHED MODE POWER SUPPLY INTEGRATED CIRCUIT

BACKGROUND OF THE INVENTION

1. Field of the Invention

The present invention relates to semiconductor integrated circuits and specifically to the integrated circuit devices used in switching power supplies with minimum numbers of pinouts.

2. Description of the Prior Art

The cost to manufacture a power supply is a principal concern in selecting between power supply types to be used in particular applications and the components selected to construct them. Switching power supplies have become cost competitive with much simpler linear power supplies because integrated circuit (IC) technology has advanced such that a majority of the complex switch mode circuits can be integrated on a single chip. As a rule of thumb, the fewer necessary pins on an IC package the lower will be the cost. A goal in switching power supply IC cost reduction has been the three-terminal package. One pin for power switching, one pin for ground and one pin for feedback. Conventional power supply ICs typically require as many as eight pins, thus limiting packaging options to the more expensive types.

FIG. 1 illustrates a prior art power supply 10 that includes a full-wave bridge rectifier 12, a filter capacitor 14, a transformer 16 with a primary winding 18 and a pair of secondary windings 20 and 22, a diode 24 and a capacitor 26 that provide DC output, a diode 28 and a capacitor 30 that provide a voltage Vbias, a compensated error amplifier 32, an opto-isolator 34, a four-pin switched mode power supply chip 36 and a Vbias smoothing capacitor 38 located near chip 36. Vbias provides power to operate chip 36. However, at power start-up, chip 36 will be without power because primary winding 18 will be open and no voltage will be induced into secondary winding 22 because chip 36 is not switching. To initiate such switching, a high voltage is tapped from the junction of a high voltage MOSFET 40 and the end of primary winding 18. This tap can supply enough current to start chip 36. A voltage regulator internal to chip 36 includes a high voltage preregulator transistor 42, a pass transistor 44 and an undervoltage comparator 46. During initial power-up when the voltage (Vs) across capacitor 38 is zero or near zero, a resistor 48 biases transistor 42 on and will pass current to charge up capacitor 38. When voltage Vs exceeds a predetermined threshold, comparator 46 will switch on transistor 44 and switch off transistor 42. Comparator 46 includes hysteresis, transistors 42 and 44 will not switch back unless the voltage Vs falls below a second threshold voltage that is lower than the first threshold voltage. With voltage Vs and transistor 44 on, power is supplied to a pulse width modulator (PWM) 50. This allows normal switching operation to begin and transistor 40 chops the current flowing through primary winding 18. Transformer 16 therefore begins operating and a voltage ($V_{bias}$) develops from secondary winding 22, diode 28 and capacitor 30. With $V_{bias}$ being supplied across capacitor 38, comparator 46 operates to keep transistor 42 off and no further high voltage power is required. A feedback signal, proportional to the DC output, is returned by way of amplifier 32 and opto-isolator 34 to PWM 50. Chip 36 therefore requires a minimum of four pins, e.g., OUT, FB, VS and GND.

In the prior art, the need for a minimum of four terminals prevents the use of low cost three-terminal packages such as industry standards TO-220, DPAK, TO-5, and equivalents. A three-terminal switched mode power supply chip is therefore needed by the industry.

SUMMARY OF THE PRESENT INVENTION

It is therefore an object of the present invention to provide a three-terminal switched mode power supply chip.

Briefly, an embodiment of the present invention is a three-terminal switched mode power supply chip with a signal terminal for accepting a combination of a feedback control signal and bias supply voltage to operate the chip. A feedback extraction circuit provides for separating the feedback signal from the power supply voltage within the chip by sensing the excess current flow through a shunt regulator.

An advantage of the present invention is that an integrated circuit is provided that allows for a simple fully integrated power supply chip with very few pins and external components.

A further advantage of the present invention is that an integrated circuit is provided that is economical.

An advantage of the present invention is that an integrated circuit is provided that eliminates a high voltage pin and a high voltage transistor area conventionally necessary for an on chip preregulator.

An advantage of the present invention is that an integrated circuit is provided that allows for a fully integrated switching power supply with only one high-voltage pin, a low-voltage pin and ground.

These and other objects and advantages of the present invention will no doubt become obvious to those of ordinary skill in the art after having read the following detailed description of the preferred embodiment which is illustrated in the various drawing figures.

IN THE DRAWINGS

DETAILED DESCRIPTION OF THE EMBODIMENTS

Figure 1:
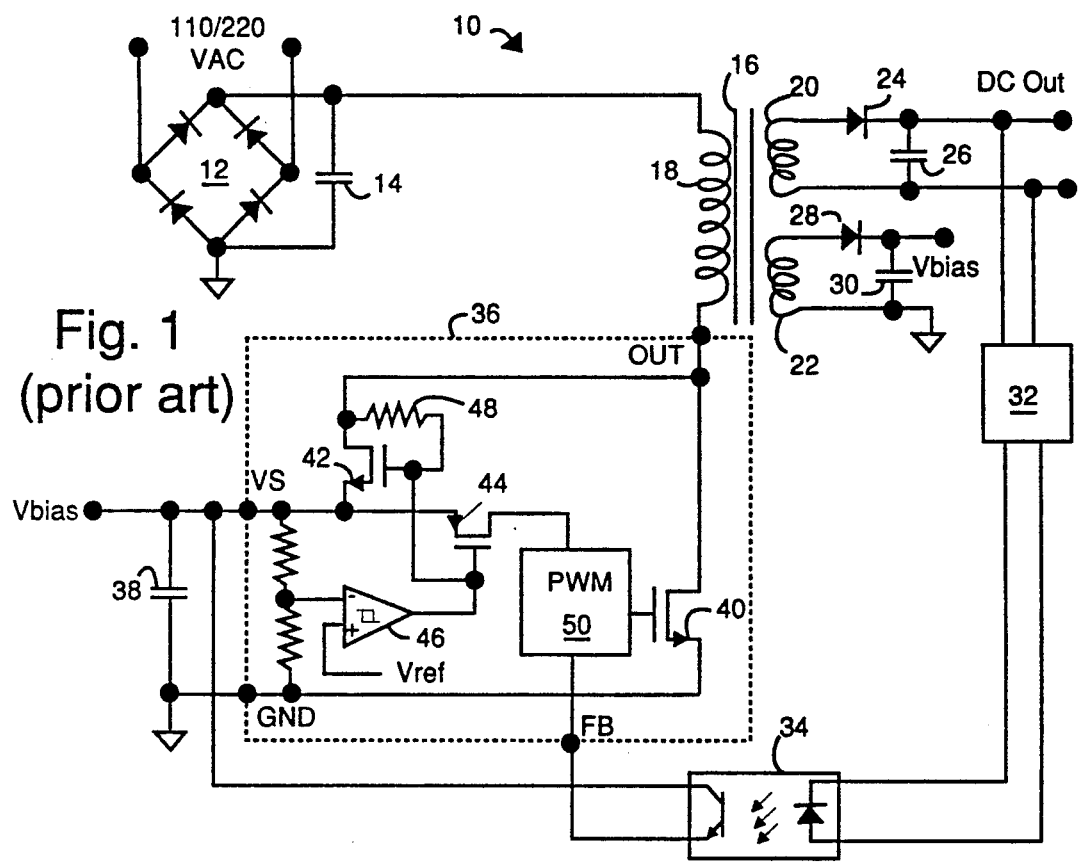
FIG. 1 is a schematic diagram of a prior art power supply.
Figure 2:
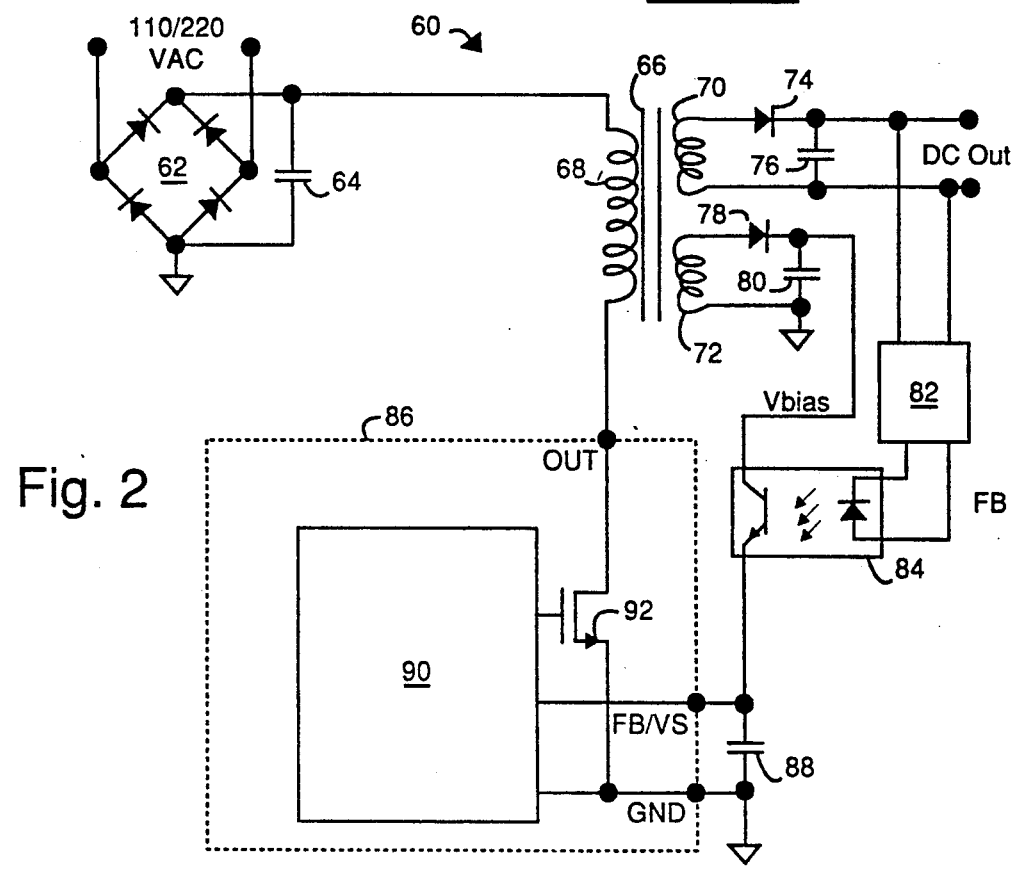
FIG. 2 is a schematic diagram of a switched mode power supply of the present invention and includes a three-terminal switched mode power supply chip.

FIG. 2 illustrates a power supply embodiment of the present invention, referred to by the general reference numeral 60. The power supply 60 comprises a full-wave bridge rectifier 62, a filter capacitor 64, a transformer 66 with a primary winding 68 and a pair of secondary windings 70 and 72, a diode 74 and a capacitor 76 that provide DC output, a diode 78 and a capacitor 80 that provides a voltage Vbias, a compensated error amplifier 82, an opto-isolator 84, a three-pin switched mode power supply chip 86 and a vbias smoothing capacitor 88 located near chip 86. $V_{bias}$ is feed through opto-isolator 84 to provide combined DC output feedback and operational power (FB/VS) to a controller 90. At power start-up, Vbias will be zero and chip 86 will be without power because primary winding 68 will be open and no voltage will be induced into secondary winding 72 because chip 86 is not switching. To initiate such switching, a low voltage is tapped from an internal junction within a high voltage MOSFET 92. High voltage is present at the switched end of primary winding 68 when MOSFET 92 is off. Chip 86 therefore needs only three pins, OUT, GND and FB/VS, and may be mounted in an inexpensive plastic TO-220 industry standard type package.

MOSFET 92 is preferably similar to that described in U.S. Pat. No. 4,811,075, issued Mar. 7, 1989, to Klas H. Eklund. An insulated-gate, field-effect transistor and a double-sided, junction-gate field-effect transistor are connected in series on the same semiconductor chip to form a high-voltage MOS transistor. An extended drain region is formed on top of a substrate of opposite conductivity material. A top layer of material, similar to the substrate, is formed by ion implantation through the same mask window as the extended drain region. The top layer covers only a middle part of the extended drain which has ends that meet with a silicon dioxide layer above. Current flow through the extended drain is controlled by the substrate and top layer which pinch-off the extended drain between them in a familiar field-effect fashion. The drift region of the main power MOSFET 92 is used to drop the high line voltage to low voltage for biasing chip 86.

Chip 86 accepts a combined feedback signal (Ifb) and internal low voltage supply current (Is) on a single pin. The supply current is approximately one milliams for CMOS versions of chip 86. The supply current also serves as a bias current for the output of opto-isolator 84. Opto-isolator 84 typically requires a bias current of 0.5-2.0 milliamps to operate optimally. In prior art power supplies, the opto-isolator bias current is in addition to current required by the switched mode power supply chip. The feedback signal secondary winding 70 modulates the current through the output transistor of opto-isolator 84. The feedback modulation is extracted from the DC supply current by controller 90.

Figure 3:
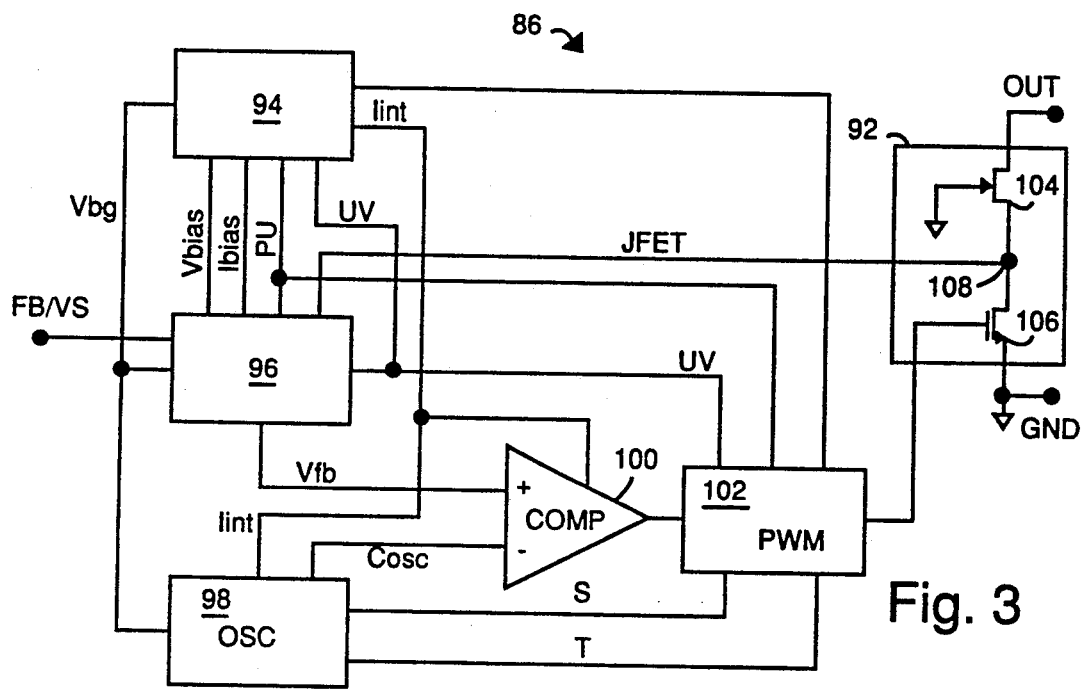
FIG. 3 is a block diagram of the switched mode power supply chip included in FIG. 2.

FIG. 3 illustrates that three-terminal regulator chip 86 comprises MOSFET 92, a bandgap and thermal shutdown 94, a functional block 96, an oscillator (OSC) 98, a comparator (COMP) 100 and a pulse width modulator (PWM) 102. An extracted feedback signal (Vfb) is output from block 96 and applied to COMP 100. MOSFET 92 comprises the equivalent of a high voltage JFET 104 with a grounded gate and a low voltage MOSFET 106. A tap 108 provides power from the junction of JFET 104 and MOSFET 106.

Figure 4:
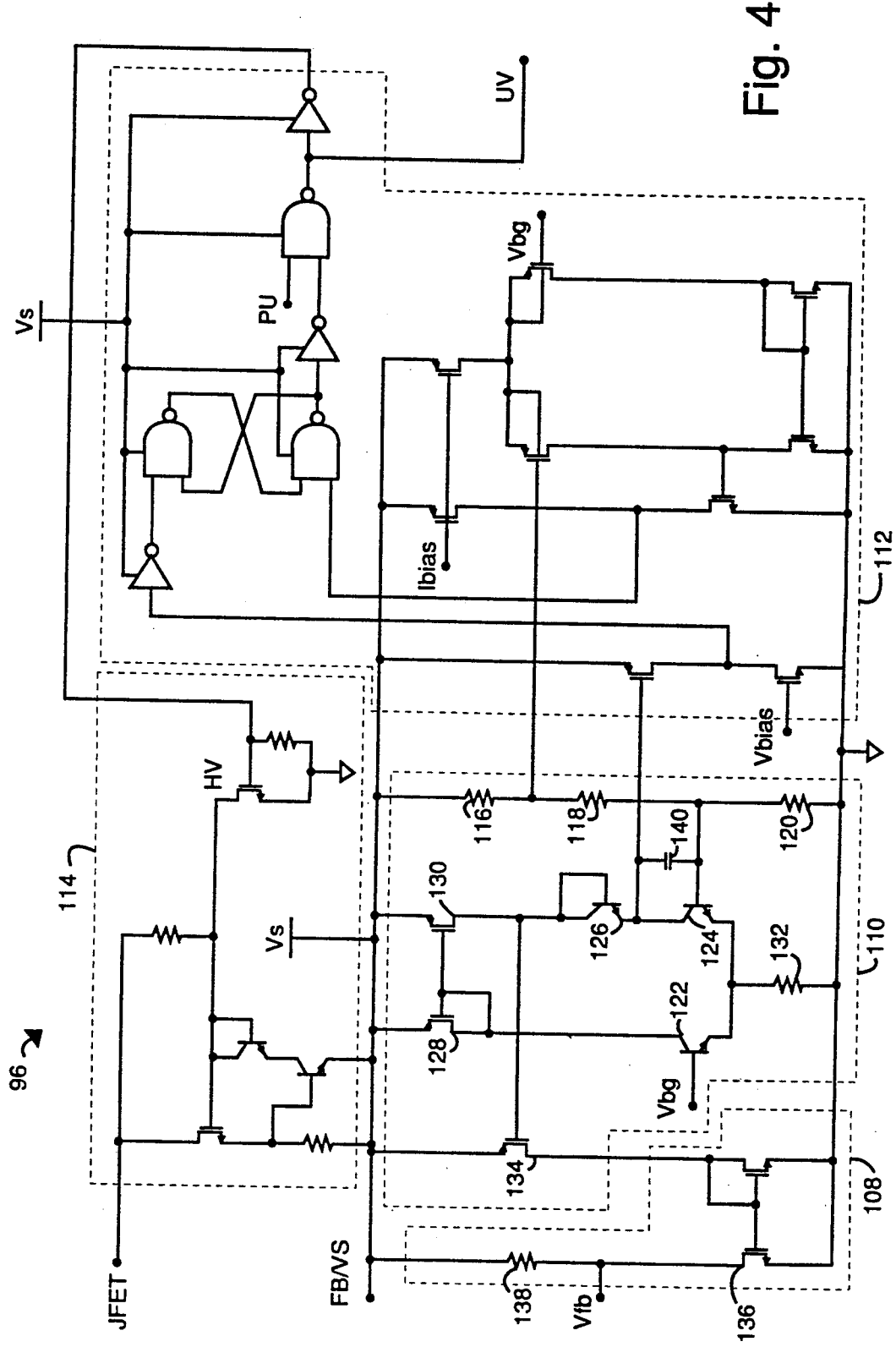
FIG. 4 is a schematic diagram of a feedback extractor, a Vs regulator and switching-noise filter, an undervoltage detector, and high voltage start-up regulator that are a part of the switched mode power supply chip included in FIG. 2.

As illustrated in FIG. 4, functional block 96 comprises a feedback extractor 108, a vs regulator and switching-noise filter 110, an undervoltage detector 112, and high voltage start-up regulator 114. Regulator and filter 110 regulates the Vs voltage by comparing a bandgap reference voltage (Vbg) to a fraction of voltage Vs, as determined by the ratio of a group of resistors 116, 118 and 120. An error amplifier comprising a set of three transistors 122, 124 and 126, a pair of transistors 128 and 130, and a resistor 132. The output of the error amp drives a shunt transistor 134. As long as there is sufficient supply current being input to FB/VS, the voltage Vs will be in regulation and any excess current will be shunted to ground through transistor 134. This excess current is mirrored and converted into an extracted feedback voltage (Vfb) by a transistor 136 and a resistor 138. During a power-up, the high voltage startup regulator 114 and capacitor 88 (FIG. 2) provide the operating current and the voltage to start chip 86. Once the power supply 60 is in operation, the secondary winding 72 and Vbias voltages begin to rise. When the DC output voltage (FIG. 2) reaches a predetermined regulation level, error amplifier 82 turns on a LED in opto-isolator 84. This, in turn, drives the output of opto-isolator 84 which starts conducting supply current to chip 86. The current continues to increase until an excess current through transistor 134 is sufficient to bring Vfb into the active range of the sawtooth waveform (1-2 volts) from OSC 98 (Cosc, FIG. 3), which is applied to the inverting input of COMP 100. This sequence initiates voltage regulation in power supply 60. When Vfb is above the normal active range, a maximum-on pulse width is sent to the output switch MOSFET 92, resulting in maximum power output during start up. When Vfb is at or below the active range, the pulse width sent to MOSFET 92 will be minimum or zero. The feedback loop automatically adjusts the pulse width to remain in the active range to provide regulation of the output voltage at secondary winding 70.

Stray switching currents in the Vs node from OSC 98, Pwm 102 and power MOSFET 92 must be prevented from contaminating Vfb output. A low pass filter is included in regulator and filter 110 using a miller capacitor 140 coupled to transistor 124. The cutoff frequency is approximately five KHz, which is low enough to effectively filter the high frequency switching noise (e.g., 100 KHz to 500 KHz) from modulating the gate of transistor 134. However, this cutoff is high enough compared to the dominant pole of the regulator loop (e.g., 0.1 Hz to 100 Hz) so as to not affect the closed loop servo control stability.

Power supply current frequency components in the feedback signal frequency range (e.g., one KHz to ten KHz) can cause instability in the power supply loop. For example, if the supply current consumption of chip 86 varies with the pulse width applied to MOSFET 92, an in-band signal would appear at Vfb and could result in an internal positive or negative feedback. The supply current should be independent of pulse width because nodes, such as the gate of MOSFET 92, are charged and discharged once every cycle, regardless of pulse width. The net DC current is zero. Near zero pulse width, there may be an exception because the gate may not fully charge before the next discharge. This could cause some jitter at near zero load, which can be dealt with in several ways. For example, a resistor connected to input of a gate driver stage will consume current in the off state of MOSFET 92 that increases when the pulse width decreases, thus negating the problem.

Figure 5:
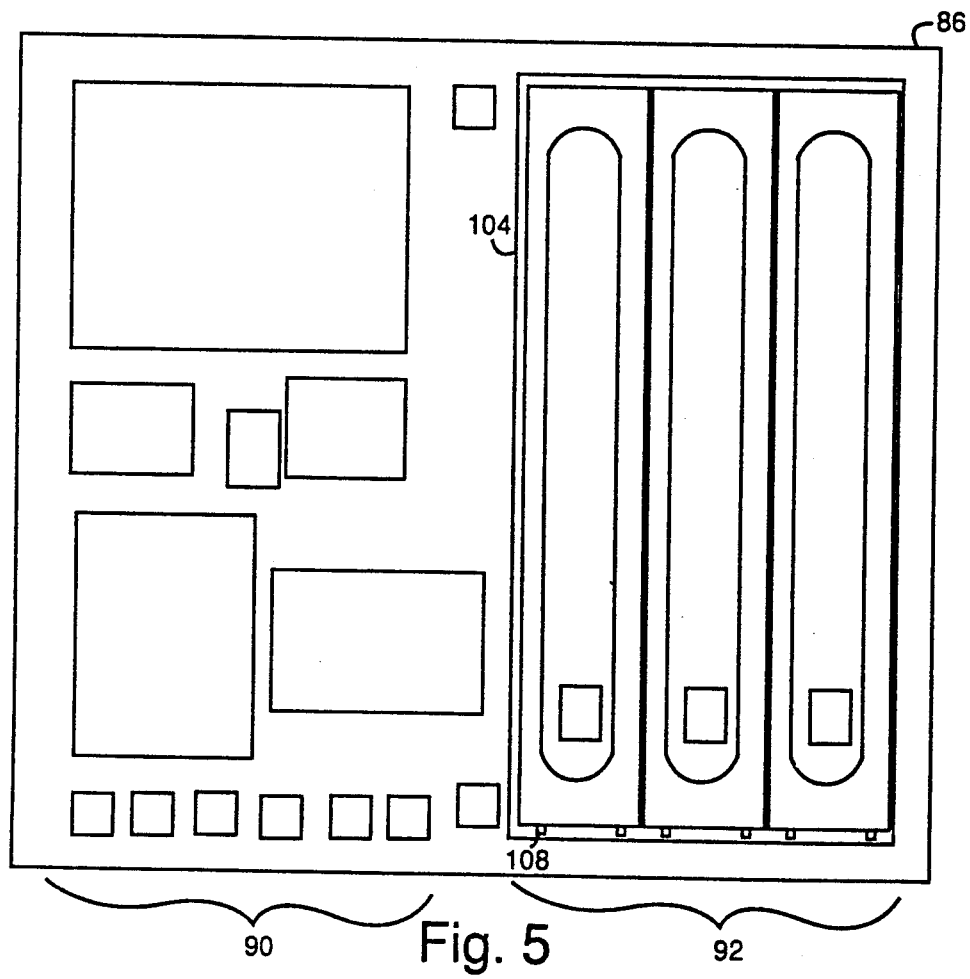
FIG. 5 is a chip map diagram of the switched mode power supply chip included in FIG. 2 showing the relative size of the high voltage MOSFET.

FIG. 5 illustrates the large amount of chip area that is required by high voltage MOSFET 92. JFET 104 consumes the greatest share of space.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A switched-mode power supply chip having exactly three electrical connections, comprising:

a first electrical connection terminal providing for a connection to a first end of a primary winding of a transformer with a second end of said primary winding connected to a source of direct current (DC) power;

a second electrical connection terminal providing for a ground reference for said source of DC power;

a third electrical connection terminal providing for a connection to a source of feedback current derived from a secondary winding of said transformer with a second end of said secondary winding connected to said ground reference for said source of DC power, wherein a combined feedback signal (Ifb) and internal low voltage supply current (Is) may be accepted on a single pin of said chip, such that said low voltage supply current may provide the operating power necessary for voltage regulation after a startup phase and during an operation phase of said chip;

a junction-type field effect transistor (JFET) having a drain electrode connected to the first electrical connection terminal, a gate electrode connected to the second electrical connection terminal, and a source electrode for providing a bias voltage that is reduced substantially from a voltage appearing at the first electrical connection terminal;

a metal oxide semiconductor field effect transistor (MOSFET) having a drain electrode connected to said source electrode of the JFET and thereby placing the MOSFET and JFET in series connection, a gate electrode for controlling a switching current through both the JFET and MOSFET in series, and a source electrode connected to the second electrical connection terminal;

voltage regulation means having an input connected to the third electrical connection terminal and an output connected to said gate of the MOSFET and having a bias voltage power supply connection to said source electrode of the JFET for switching the MOSFET and JFET on and off according to a feedback current received at the third electrical connection terminal, wherein a voltage output by said transformer is thereby regulated; and input means connected to the third electrical connection terminal for accepting a combined feedback signal (Ifb) and internal low voltage supply current (Is) on a single pin, wherein said low voltage supply current provides operating power for the voltage regulation means after said startup and during said operation of said chip.

2. A semiconductor chip having as few as three external electrical connections, comprising:

a first electrical connection terminal providing for a pulse-width modulated output relative to an internal ground reference;

a second electrical connection terminal providing for connection of said internal ground reference to an external ground reference;

a third electrical connection terminal providing for a connection to a combined source of bias supply power and a feedback current that is controlled in part by said pulse-width modulated output;

voltage regulation means having an input connected to the third electrical connection terminal and an output connected to control the on and off duty cycle of an output transistor connected between the first and second electrical connection terminals according to said feedback current received at the third electrical connection terminal, wherein an output of a circuit including said chip is thereby regulated; and input means connected to the third electrical connection terminal for accepting a combined feedback signal (Ifb) and internal low voltage supply current (Is) on a single pin for providing operating power with said low voltage supply current to the voltage regulation means after a startup and during operation of said chip.

3. The chip of claim 2, further comprising:

a first transistor having a drain electrode connected to the first electrical connection terminal, a gate electrode connected to the second electrical connection terminal, and a source electrode for providing a bias voltage that is reduced substantially from a voltage appearing at the first electrical connection terminal; and a second transistor having a drain electrode connected to said source electrode of the first transistor and thereby placing the second transistor and first transistor in series connection, a gate electrode for controlling a switching current through both the first transistor and second transistor in series, and a source electrode connected to the second electrical connection terminal.

4. A switched-mode power supply chip having as few as three electrical connections, comprising:

a first electrical connection terminal providing for a connection to a first end of a primary winding of a transformer with a second end of said primary winding connected to receive a source of direct current (DC) power;

a second electrical connection terminal providing for a ground reference for said source of DC power;

a third electrical connection terminal providing for a connection to a sourced of feedback current derived from a secondary winding of said transformer with a second end of said secondary winding connected to said ground reference for said source of DC power;

voltage regulation means having an input connected to the third electrical connection terminal and an output connected to control an output transistor connected between the first and second electrical connection terminals on and off according to a feedback current received a the third electrical connection terminal, wherein a voltage output by said transformer is thereby regulated and the voltage regulation means is provided with a bias voltage power supply current during operation of said chip; and input means connected to the third electrical connection terminal for accepting a combined feedback signal (Ifb) and internal low voltage supply current (Is) on a single pin, wherein said low voltage supply current provides operating power for the voltage regulation means after said startup and during said operation of said chip.

5. The chip of claim 4, further comprising:

a first transistor having a drain electrode connected to the first electrical connection terminal, a gate electrode connected to the second electrical connection terminal, and a source electrode for providing a bias voltage to the voltage regulation means that is reduced substantially from a voltage appearing at the first electrical connection terminal; and a second transistor having a drain electrode connected to said source electrode of the first transistor and thereby placing the second transistor and first transistor in series connection, a gate electrode for controlling a switching current through both the first transistor and second transistor in series, and a source electrode connected to the second electrical connection terminal.

6. The chip of claim 5, wherein:

the first transistor is a junction-type field effect transistor (JFET);

the second transistor is a metal oxide semiconductor field effect transistor (MOSFET); and the voltage regulation means comprises a pulse width modulator.

7. The chip of claim 4, wherein:

the voltage regulation means further comprises a feedback extractor for separating said feedback signal (Ifb) from said internal low voltage supply current (Is), a Vs regulator and switching-noise filter for separating said feedback signal (Ifb) from said internal low voltage supply current (Is) and then stabilizing it for use by the voltage regulation means.

8. The chip of claim 7, wherein:

the voltage regulation means further includes a high-voltage startup regulator connected to the first electrical connection terminal for providing for a controlled voltage power supply source to the remaining parts of the voltage regulation means during said startup of said chip.

9. The chip of claim 7, wherein:

the voltage regulation means and said feedback extractor include means for monitoring whether there is a sufficient supply current being input to the third electrical connection terminal such that said voltage Vs may be in regulation and that provides for a shunting of an excess current to ground and a mirroring and a converting said shunted excess current to produce an extracted feedback voltage (Vfb).

10. A power supply, comprising:

a three-terminal switched-mode power supply chip, including:

a first electrical connection terminal providing for a connection to a first end of a primary winding of a transformer with a second end of said primary winding connected to receive a source of direct current (DC) power;

a second electrical connection terminal providing for a ground reference for said source of DC power;

a third electrical connection terminal providing for a connection to a source of feedback current derived from a secondary winding of said transformer with a second end of said secondary winding connected to said ground reference for said source of DC power;

voltage regulation means having an input connected to the third electrical connection terminal and an output connected to control an output transistor connected between the first and second electrical connection terminals on and off according to a feedback current received at the third electrical connection terminal for regulating a voltage output by said transformer and for providing the voltage regulation means with a bias voltage power supply current during operation of said chip; and input means connected to the third electrical connection terminal for accepting a combined feedback signal (Ifb) and internal low voltage supply current (Is) on a single pin, wherein said low voltage supply current provides operating power for the voltage regulation means after said startup and during said operation of said chip;

a transformer, including a primary winding and a secondary winding, connected at a first end of said primary winding to said first electrical connection terminal of the switched-mode power supply chip, and connected at a second end of said primary winding to receive a source of direct current (DC) power;

DC output means for converting an output of a said secondary winding of the transformer to a regulated DC output voltage; and bias means for converting a voltage induced in said secondary winding of the transformer to a bias supply and connected to said third electrical connection terminal to power the switched-mode power supply chip.

11. The power supply of claim 10, wherein:

the power supply chip further includes:

a first transistor having a drain electrode connected to the first electrical connection terminal, a gate electrode connected to the second electrical connection terminal, and a source electrode for providing a bias voltage that is reduced substantially from a voltage appearing at the first electrical connection terminal; and a second transistor having a drain electrode connected to said source electrode of the first transistor and thereby placing the second transistor and first transistor in series connection, a gate electrode for controlling a switching current through both the first transistor and second transistor in series, and a source electrode connected to the second electrical connection terminal.

* * * * *